United States Patent
Meyer

(10) Patent No.: US 7,011,380 B2
(45) Date of Patent: Mar. 14, 2006

(54) ELECTROHYDRAULIC PRESSURE REGULATING DEVICE

(75) Inventor: Holger Meyer, Eschborn (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 6 days.

(21) Appl. No.: 10/485,022

(22) PCT Filed: Aug. 9, 2002

(86) PCT No.: PCT/EP02/08954

§ 371 (c)(1),
(2), (4) Date: Jan. 28, 2004

(87) PCT Pub. No.: WO03/016116

PCT Pub. Date: Feb. 27, 2003

(65) Prior Publication Data

US 2004/0207255 A1    Oct. 21, 2004

(30) Foreign Application Priority Data

Aug. 13, 2001 (DE) .................. 101 38 627
Feb. 21, 2002 (DE) .................. 102 07 247

(51) Int. Cl.
*B60T 8/36* (2006.01)
(52) U.S. Cl. ............... 303/119.3; 303/DIG. 10
(58) Field of Classification Search ........... 303/119.2, 303/119.3, DIG. 3, DIG. 10, 20
See application file for complete search history.

(56) References Cited

U.S. PATENT DOCUMENTS 6,007,162 A * 12/1999 Hinz et al. ............ 303/119.3
6,382,738 B1 * 5/2002 Bayer et al. ............ 303/119.2
6,662,825 B1 * 12/2003 Frank et al. ............ 137/557
6,799,812 B1 * 10/2004 Risch et al. ............ 303/119.2

FOREIGN PATENT DOCUMENTS

| DE | 195 14 383 A1 | 10/1996 |
|---|---|---|
| DE | 198 32 435 A1 | 12/1998 |
| DE | 197 55 821 A1 | 6/1999 |
| DE | 198 41 334 A1 | 10/1999 |
| DE | 198 49 287 A1 | 1/2000 |
| DE | 101 22 330 A1 | 2/2002 |
| DE | 101 07 239 A1 | 8/2002 |
| EP | 0 580 382 A1 | 1/1994 |
| EP | WO 99/50115 A1 * | 10/1999 |
| EP | 1016573 A2 * | 7/2000 |
| WO | WO 00/30909 A1 | 6/2000 |
| WO | WO 3064230 A1 * | 8/2003 |

OTHER PUBLICATIONS

German Search Report of Application No. 102 07 247.7 dated Aug. 5, 2002.
International Search Report of Application No. PCT/EP02/08954 dated Dec. 16, 2002.

* cited by examiner

*Primary Examiner*—Thomas Williams
(74) *Attorney, Agent, or Firm*—RatnerPrestia

(57) ABSTRACT

The invention relates to an electrohydraulic pressure regulating device comprising at least one pressure sensor which has a pressure measuring cell and an electronic evaluating circuit for processing measuring signals obtained at a pressure measuring membrane, wherein the evaluating circuit provided for the pressure sensor is arranged on the circuit carrier of the electronic controller which comprises the evaluating circuit necessary for the actuation of the pressure control valve.

11 Claims, 2 Drawing Sheets

ELECTROHYDRAULIC PRESSURE REGULATING DEVICE

TECHNICAL FIELD

The present invention relates to a pressure regulating device, in particular for motor vehicle brake systems.

BACKGROUND OF THE INVENTION

Electronically controlling brake devices are known in the art (Brake Handbook, 'Electronic brake systems', 1995, ISBN 3-89059-026-8). They are composed of a hydraulic control unit, also referred to as valve block (VB), and an electronic controller (EC). The hydraulic control unit comprises a motor-and-pump assembly and a valve block flanged thereto. During brake control, the motor-and-pump assembly furnishes the pressurized fluid volume required in the pressure build-up phase. The inlet and outlet valves grouped in the valve block permit the modulation of the wheel brake pressures. The brake lines leading to the wheel brakes are connected to the valve block. The valves are connected hydraulically to the valve block by means of bores. Signals of the four wheel speed sensors are sent to the controller.

It is possible to improve brake pressure control by the provision of one or more pressure sensors in the hydraulic lines that lead to the wheel brake cylinders. The pressure sensors are mounted directly on the valve block in prior art devices on which the invention is based. Apart from pressure sensors, the valve block comprises, among others, electromagnetically operable hydraulic valves. Electric coils necessary for the operation of the hydraulic valves are arranged inside the controller. The brake control device is completed in a later assembly step by joining valve block and controller. To this end, valve block and controller are designed as a so-called magnetic plug. In the joining action, the coils slide over the hydraulic valves arranged in the valve block. This action additionally establishes the electrical contacts between the pressure sensors arranged in the valve block and the circuit carrier arranged in the controller by way of spring contacts.

In the prior art device with pressure sensors arranged in the valve block, the electrical components necessary for the electronic conditioning of the measuring signals received at the pressure sensor membrane are either comprised in a pressure sensor modular unit or, in the case of several pressure sensors, comprised in a pressure sensor module. The pressure sensor unit or the pressure sensor module is thus arranged on the valve block and rigidly connected to the valve block after the assembly of the valve block.

From this ensues the disadvantage that normally the entire valve block must be replaced when one pressure sensor fails. A test for the proper functioning of the pressure sensor(s) can only be carried out after the valve block and the controller have been joined. This causes imponderable conditions that can increase manufacturing costs.

DE 197 55 821 A1 discloses a control circuit and a pressure sensor accommodated in a joint housing of an add-on control device, on the bottom side of which a pressure measuring element with a plug-in pipe is arranged. To form a pressure control device, the plug-in pipe extends into a fluid channel of a hydraulic block when the add-on control device is fitted. It is complicated under manufacturing technology aspects that the hydraulic block includes a blind-end bore, an inserting cone, a supporting disc, and a collecting funnel in the area of the fluid channel in order to connect the fluid channel to the plug-in pipe. This condition requires sufficient space for the attachment of the pipe in the hydraulic block in order to establish the connection of the plug-in pipe with the fluid channel. Several pressure sensors with the associated evaluating circuit are grouped on one common carrier, being attached as an independent assembly in the add-on control device. This fact requires much space and additional effort in testing.

An object of the present invention is to design a pressure regulating device of the type referred to hereinabove in such a fashion that the above-mentioned shortcomings are avoided.

For the sensor-type scanning of a hydraulic channel with a pressure transducer, the invention preferably arranges for a structurally separate arrangement of the pressure measuring cell, which may, e.g., comprise a pressure measuring membrane and a passive uncompensated wire strain gauge, and the electronic circuit for the conditioning of the signals of the wire strain gauge in the unit of the electronic controller.

The electrohydraulic pressure regulating device of the invention is comprised of a valve block and an electronic controller to form a monolithic unit. Preferably, the two units are configured as magnetic plugs.

Thus, the invention obviates the need for the otherwise usual integration of an active electronic circuit for the pre-amplification of signals, for signal conditioning and error compensation of the wire strain gauge in the modular unit of the pressure sensor.

In a preferred embodiment of the invention, the electronic components for the signal conditioning for one or more pressure transducers are realized as a part of a larger integrated circuit IC in the controller.

Preferably, the individual signals of all pressure transducers are conditioned in terms of signal technology for conditioning the sensor signals and subsequently sent to an arithmetic unit. In this operation it is expedient, as will be described hereinbelow, that error compensation is not effected within the circuit but within the arithmetic unit.

In another preferred embodiment, the controller incorporates calculation means, especially configured as one or more microcomputers or microcontrollers that permit minimizing the errors of the measuring chain of each individual pressure channel by the electronic evaluation of two functionally separate calculations of correction variables or correction tables. For example, methods for minimizing errors in the treatment of the pressure measuring signals can be performed with the mentioned calculation means. Thus, it is, e.g., possible to determine the deviations of a pressure transducer as a function of pressure and temperature and/or the deviations of the signal conditioning stage associated with the pressure transducer as a function of the signal input voltage and the temperature by way of point measurements and to memorize the result of this determination.

Preferably, the device of the invention is implemented in electrohydraulic brake systems (EHB).

One of the advantages of the invention is that defective pressure sensors can be checked and exchanged at a substantially lower cost due to the arrangement in the electronic controller than would be the case if the pressure sensor were mounted on the valve block.

DETAILED DESCRIPTION OF THE PREFERRED EMBODIMENTS

Figure 1:
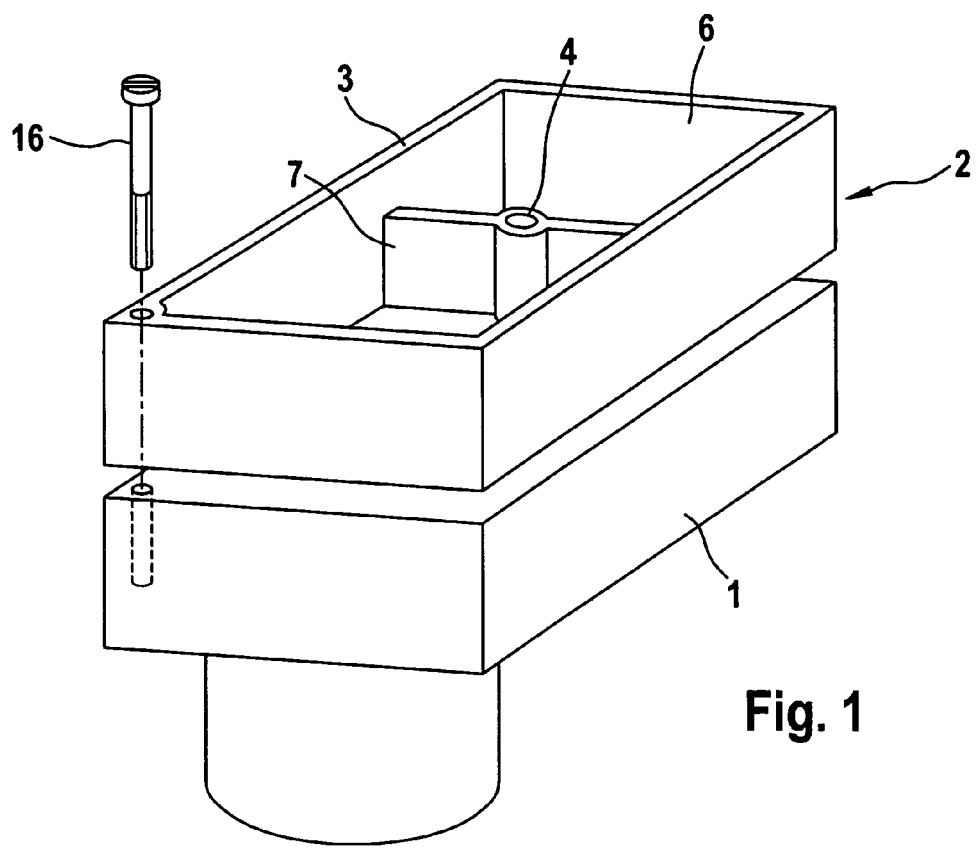
FIG. 1 is a representation of a modular unit of a pressure regulating device for motor vehicle brake systems comprised of a controller and a valve block.

FIG. 1 shows a schematically simplified view of an electrohydraulic pressure regulating device 2 for the actuation of hydraulically operated motor vehicle brakes composed of a valve block 1 and a controller 3. The valve block 1 and controller 3 form a compact modular unit. Valve block 1 and controller 3 are connected by way of an electric and magnetic interface (not shown) (so-called magnetic plug). Upon requirement, valve block 1 conveys pressure-modulated brake fluid to the wheel brakes through non-illustrated pressure control valves contained therein, which are adapted to be actuated by the controller 3. The pressure control valves in the valve block 1 are actuated by way of electric coils accommodated in the controller 3 and seated onto the so-called valve domes (valve domes and coils are not shown). The valve coils are electrically connected to components on a circuit carrier 9 in controller 3.

Pressure measuring cells 4' of several pressure sensors 4 are arranged beside the valve coils at appropriate positions within housing 6. For the sake of clarity, only one pressure sensor 4 is shown. The pressure sensor 4 is held by a web 7 connected to the wall of housing 6, the web being made of the material the controller housing is made of. Web 7 has a thicker wall in the area of the pressure measuring cell 4' for accommodating the pressure measuring cell 4'.

The housing 6 of the controller 3 is connected to the valve block 1 by way of at least one operatively and/or positively engaged connecting means 16 (screw, rivet, etc.). Controller 3 is secured to valve block 1 by connecting means 16.

Figure 2:
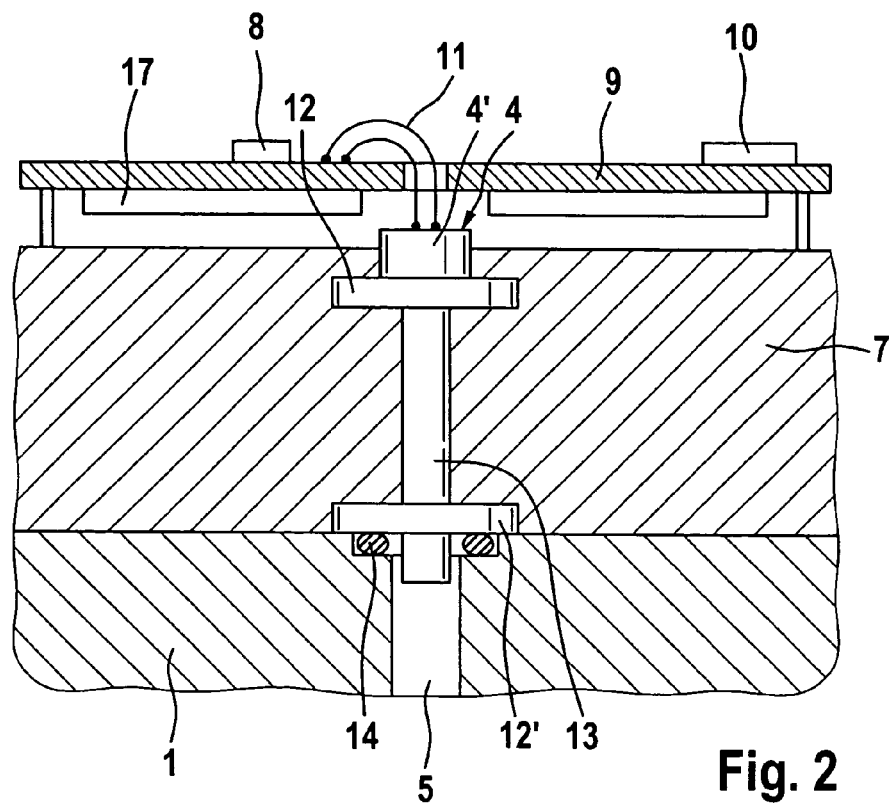
FIG. 2 is a cross-sectional view of a pressure measuring cell installed into the housing of the controller.

FIG. 2 shows a pressure measuring cell 4' of a pressure sensor 4 being connected to a tubular supply element 13 that is plugged into a pressure line 5 of valve block 1 when the controller 3 is mounted onto valve block 1. Sealing with respect to the valve block 1 is carried out by way of an annular seal 14 that is compressed between a bore step adjacent to the pressure line 5 and a ring-disc-shaped holding means 12' connected to supply element 13. To guide the pressure measuring cell 4' and the supply element 13 in web 7, there is provision of two disc-shaped holding means 12, 12' arranged at the two tubular ends of the tubular supply element 13. Lamination with the material of web 7 allows a safe fixation of the pressure sensor 4 that is formed of the supply element 13, the holding means 12, 12' and the pressure measuring cell 4' within web 7. According to the drawing, the pressure measuring cell 4' that comprises a measuring membrane and wire strain gauges arranged thereon is connected directly to one of the two holding means 12. By way of bond wires 11 or flexible foil, the wire strain gauges are connected to the circuit carrier 9 that is fixed as a horizontal printed circuit board above the web 7 in the frame-shaped housing 6. Circuit carrier 9 carries the electronic components of the controller 3 required for both the pressure sensor 4 and for the actuation of the pressure control valves. The printed circuit board made of plastics can be furnished with a metallic cold plate 17 for cooling the electric components. The holding means 12 is connected to the web 7 by spray-coating with a plastic material, additionally forming the housing 6. More specifically, spray-coating may include injection molding a plastic material around holding means 12 in the web 7.

Electronic components 8 for evaluating the signals of the pressure measuring cell 4' and a microcontroller 10 are arranged on the circuit carrier 9.

Figure 3:
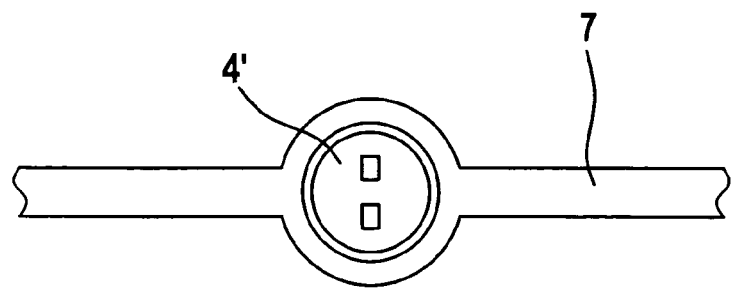
FIG. 3 is a top view of a pressure measuring cell installed into the housing of the controller.

FIG. 3 shows a top view of web 7 into which a pressure measuring cell 4' is injection-molded. The web 7 is appropriately made of the material of the controller housing and is favorably manufactured in one operation with the controller housing. It is, of course, also possible to attach the pressure measuring cell 4' in web 7 in any other way, such as by screwing, plugging, latching, cementing, or by means of a thermoplastic connection.

Figure 4:
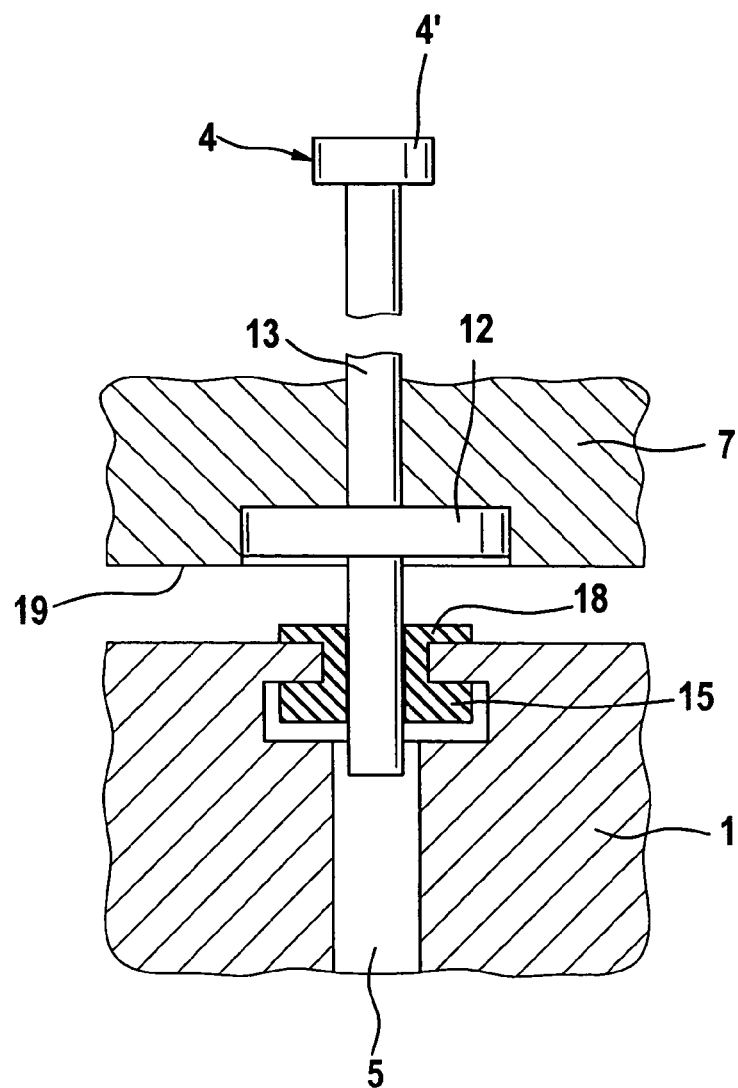
FIG. 4 is an embodiment of a pressure-tight connection of a pressure measuring cell in a valve block.

FIG. 4 shows an example for a pressure-tight coupling of a pressure measuring cell 4' to a pressure line 5 in the valve block 1. In the pressure line 5 provided with a step, a plug 15 made of rubber is retained on the end surface of valve block 1 facing web 7, the plug being expediently shaped like a nozzle or a similar element so that the plug 15 is fixed in position and additionally forms a sealing surface 18 between the valve block 1 and the disc-shaped holding element 12 at the supply element 13.

When controller 3 and valve block 1 are joined during the assembly, the tubular supply element 13 plunges in a press fit and sealingly into an axial opening of the plug 15. Additional sealing is achieved by compressing the disc-shaped sealing surface 18 at plug 15 between the holding means 12 and the valve block 1 as soon as the housing 6 is urged onto the valve block 1 by means of appropriate fastening means 16. As this occurs, it is especially appropriate that the disc-shaped holding means 12 is arranged so that it ends flush in a roughly plane fashion with the bottom edge 19 of the controller 3 that faces the valve block 1.

When there are fewer demands placed on the seal-tightness of the above-mentioned connection, it can be suitable to design the seal only by means of a sealing ring 14 (cf FIG. 2), thereby obviating the need for a plunging pipe.

The invention disclosed provides a pressure regulating device 2 that permits a particularly simple integration of one or more pressure sensors 4 in a housing 6 because the electronics (evaluating circuit 8) necessary for the function of each pressure sensor 4 is arranged on a circuit carrier 9 of the electronic controller 3. The controller additionally includes the circuits for the operation of the pressure control valves and, as the case may be, also the circuits for the operation of a pump motor fitted to the valve block 1. The result is that all mentioned circuits may be accommodated in an extremely compact way, e.g., on one single printed circuit board, thereby allowing a surprisingly simple function test of all mentioned circuits. Whenever an error occurs, it is only necessary to exchange the extremely inexpensive printed circuit board (circuit carrier 9). A low-cost replacement of the frame-shaped housing 6 can be realized in an equally simple fashion in the event of a defect in the pressure measuring cell 4' because the pressure measuring cell 4' is injection-molded.

The invention claimed is:

1. Electrohydraulic pressure regulating device comprising: a valve block and an electronic controller, said controller including a housing and a circuit carrier located therein and joined to said valve block to form a modular unit, said housing being formed with a web extending generally parallel to the outer walls thereof, at least one pressure sensor arranged within said modular unit for detecting the pressure of a hydraulic fluid prevailing in a pressure line of the valve block, said pressure sensor including a pressure measuring cell carried in said web and being connected to an electronic circuit located on said circuit carrier for processing measured pressure signals from said cell, at least one pressure control valve arranged in said valve block, said pressure control valve being connected to said electronic circuit whereby it is operated by said electronic circuit, a tubular supply element extending through said valve block and terminating at one end in a pressure line and at its other end adjacent said pressure measuring cell, and two holders positively carried in said web, said holder(s) being directly connected to said tubular supply element to retain said tubular supply element in operative position with said pressure measuring cell, wherein each of said holders is in the form of a disc, one of said discs being adjacent the pressure sensor, and the other of said discs being adjacent the valve block.

2. Pressure regulating device as claimed in claim 1, wherein a plurality of pressure sensors are arranged inside the housing of the electronic controller.

3. Pressure regulating device as claimed in claim 1, wherein the pressure measuring cell is connected to the evaluating circuit by means of flexible conductors.

4. Pressure regulating device as claimed in claim 3, wherein the flexible conductors are contact springs, flexible foils, wires, or bond wires.

5. Pressure regulating device as claimed in claim 1, wherein the pressure measuring cell is connected to the housing of the electronic controller directly and/or by way of the holder(s), and the connection is made especially by injection-molding a plastic material of the housing.

6. Pressure regulating device as claimed in claim 1, wherein several electronic circuits of several pressure sensors are grouped in an integrated circuit on the circuit carrier provided for the pressure control valve.

7. Pressure regulating device as claimed in claim 6, wherein an output signal of the electronic unit is sent to an arithmetic unit.

8. Pressure regulating device as claimed in claim 1, wherein the pressure sensor measuring cell and/or holder(s) connected operatively and/or positively to the pressure sensor is joined at a web connected to the housing.

9. Pressure regulating device as claimed in claim 1, wherein the holding means is connected to the web by spray-coated plastic material.

10. Pressure regulating device as claimed in claim 1, wherein the tubular supply element and/or the holder(s) establishes a pressure-tight connection to the valve block by way of a seal that has an annular shape.

11. Pressure regulating device as claimed in claim 1, wherein the tubular supply element and/or the holder(s) establishes a pressure-tight connection to the valve block by way of a seal that has a plug-like shape.

* * * * *